(12) United States Patent
Hoffman

(10) Patent No.: US 7,717,680 B2
(45) Date of Patent: May 18, 2010

(54) CHARGING SYSTEM

(75) Inventor: Fred W. Hoffman, Columbia Station, OH (US)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 1099 days.

(21) Appl. No.: 11/375,811

(22) Filed: Mar. 15, 2006

(65) Prior Publication Data

US 2007/0214963 A1 Sep. 20, 2007

(51) Int. Cl.
F04B 49/06 (2006.01)
F04B 43/12 (2006.01)
B60C 23/10 (2006.01)
E03B 5/00 (2006.01)

(52) U.S. Cl. .................. 417/44.2; 417/53; 152/415; 137/565.18

(58) Field of Classification Search ......... 152/415–417; 137/899.4, 568.18, 565.18; 417/44.2, 53
See application file for complete search history.

(56) References Cited

U.S. PATENT DOCUMENTS

| | | | |
|---|---|---|---|
| 4,619,303 A * | 10/1986 | Bryan et al. ............... | 152/416 |
| 4,782,878 A | 11/1988 | Mittal | |
| 4,862,938 A * | 9/1989 | Mittal ...................... | 152/417 |
| 4,875,509 A * | 10/1989 | Da Silva .................... | 141/38 |
| 5,244,027 A * | 9/1993 | Freigang ................... | 152/416 |
| 6,561,017 B1 | 5/2003 | Claussen et al. | |
| 6,857,311 B2 | 2/2005 | Gonazga | |

* cited by examiner

*Primary Examiner*—Charles G Freay
(74) *Attorney, Agent, or Firm*—Calfee, Halter & Griswold LLP

(57) ABSTRACT

A charging system used for supplying compressed air to a destination includes a compressor for generating the compressed air and a reservoir capable of being alternately discharged and recharged with the compressed air. A supply line fluidly connects the compressor, the reservoir, and the destination. A control valve positioned along the supply line is used in controlling flow of the compressed air from the charging system to the destination. A first branch line and a second branch line are positioned between the reservoir and the supply line. A check valve is positioned along the first branch line that when opened allows the compressed air to flow out of the reservoir into the supply line and when closed prohibits the compressed air from flowing into or out of the reservoir. A pressure protection valve is positioned along the second branch that opens to allow the compressed air to flow into the reservoir when the pressure in the supply line is above a threshold pressure.

39 Claims, 1 Drawing Sheet

CHARGING SYSTEM

TECHNICAL FIELD

The present invention is generally related to a charging system for supplying compressed air to a specified destination. More particularly, the present invention is related to a charging system for supplying dry compressed air from a first source, a second source, or both the first and second sources to equipment requiring dry compressed air. More specifically, the present invention is related to a charging system that, when subject to demands of equipment requiring dry compressed air, can supply dry compressed air from both the first and second sources simultaneously.

BACKGROUND

Vehicles such as buses and trucks require supplies of compressed air. For example, equipment such as central tire inflation systems used on buses and trucks requires compressed air to inflate and deflate the tires of these vehicles. Previously, compressed air has been supplied to the central tire inflation systems solely from air compressors. However, because of the large demands of the central tire inflations systems, the compressors are often incapable of meeting these demands within an acceptable time period.

As an alternative to solely using compressors, air reservoirs have been used to supply compressed air directly to the central tire inflation system. However, to satisfy the demands of the central tire inflation systems, the air reservoirs must have large sizes. The large sizes of the air reservoirs have drawbacks because of the space limitations of buses and trucks. As such, there is a need for charging system to overcome the above-discussed limitations.

DISCLOSURE OF INVENTION

The present invention contemplates charging system for supplying compressed air to a destination, the charging system including a compressor for generating compressed air, and a reservoir capable of storing the compressed air, where, under a predetermined pressure condition, the compressor and the reservoir simultaneously supply the compressed air to the destination.

The present invention also contemplates a charging system for supplying compressed air to a destination, the charging system including a compressor for generating compressed air, and a reservoir capable of storing the compressed air, the compressor and the reservoir being arranged parallel with one another, where the compressor and the reservoir fluidly communicate with the destination under a first pressure condition, and where the compressor fluidly communicates with the reservoir under a second pressure condition.

The present invention further contemplates an apparatus for supplying compressed air to equipment requiring compressed air, the apparatus including a compressor for generating the compressed air, a reservoir capable of being discharged and recharged with the compressed air, a check valve positioned between the reservoir and the equipment, where the check valve opens to provide the compressed air to the destination, and a pressure protection valve positioned between the reservoir and the compressor, where the pressure protection valve opens so that the reservoir can be recharged with compressed air.

The present invention still further contemplates an apparatus for supplying compressed air to equipment requiring compressed air, the apparatus including a means for generating compressed air, a means for storing compressed air, a supply line connecting the means for generating, the means for storing, and the equipment, and a means for simultaneously communicating the means for generating and the means for storing with the equipment as a function of the pressure in the means for storing in relation to a specified set-point and as a function of the pressure in the means for storing in relation to the pressure in the supply line.

The present invention still further contemplates a method for providing compressed air to equipment requiring compressed air, the method including connecting a compressor and a reservoir to the equipment via a supply line, opening and closing a control valve positioned along the supply line according to the requirements of the equipment, and simultaneously supplying compressed air from the compressor and the reservoir to the equipment under a predetermined pressure condition.

Further embodiments, variations, and enhancements are also described herein.

DETAILED DESCRIPTION OF THE INVENTION

Figure 1:
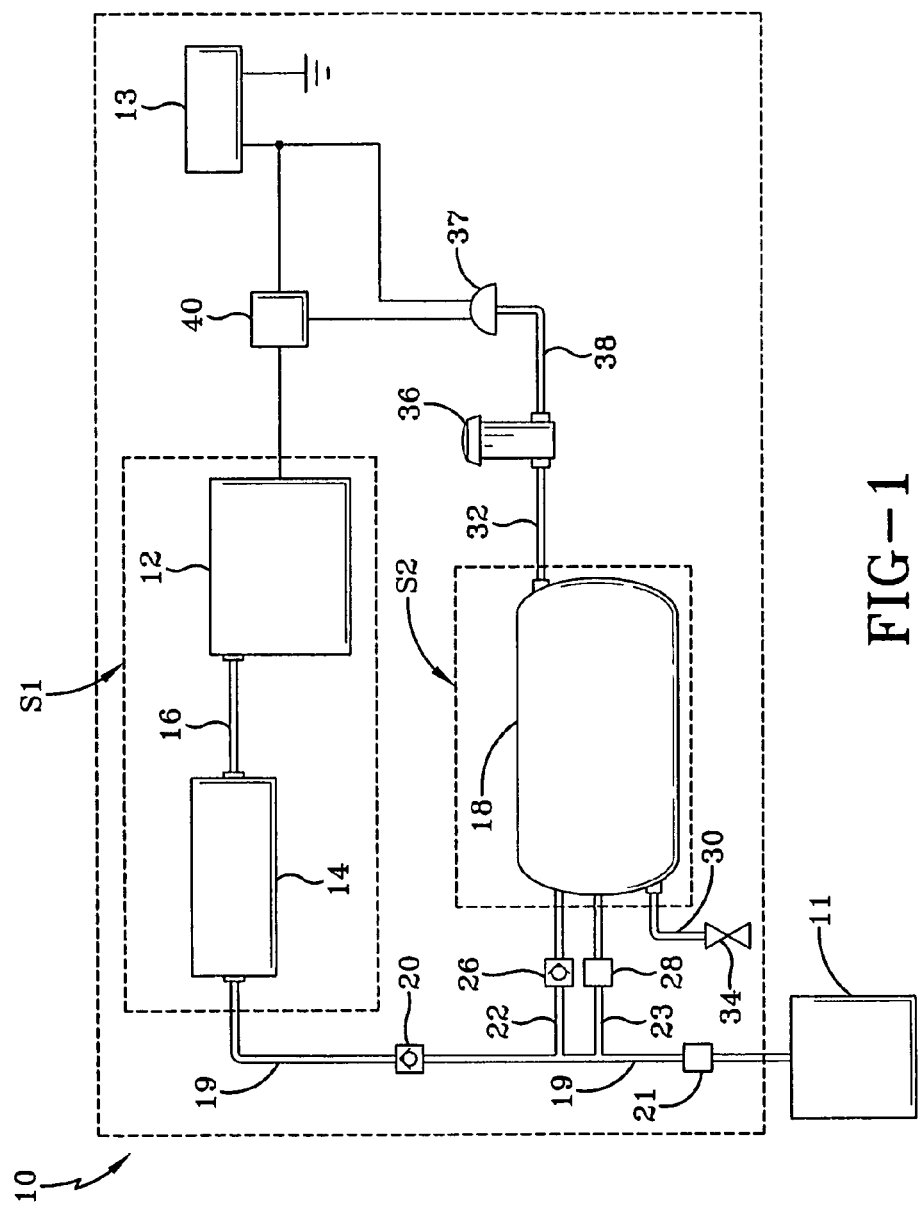
FIG. 1 is a schematic representation of the charging system according to the present invention.

The charging system of the present invention is generally indicated by the numeral 10 in the accompanying drawings. The charging system 10 can be used to supply dry compressed air to equipment such as a central tire inflation system 11. For example, according to the demands of an operator, the central tire inflation system 11 is used for inflating and deflating tires of vehicles including heavy vehicles such as buses and trucks. To facilitate inflation and deflation of the tires, the central tire inflation system 11 requires the supply of dry compressed air provided by the charging system 10, and, as discussed below, the charging system 10 is capable of supplying dry compressed air from two (2) sources.

As shown in FIG. 1, the charging system 10 includes an air compressor 12. Operation of the compressor 12 serves to generate compressed air at between 35 and 170 lbs/in$^2$. As those skilled in the art will appreciate, the compressor 12 can be selected from a variety of types and may have various configurations. For example, the compressor 12 can be a 12 or 24 V oil-less compressor driven by the battery 13 of the vehicle.

The charging system 10 also includes an air dryer 14. The air dryer 14 serves to remove moisture from the compressed air generated by the compressor 12 so that dry compressed air can be supplied to the central tire inflation system 11. As those skilled in the art will appreciate, the air dryer 14 can also be selected from a variety of types and may have various configurations. For example, the air dryer 14 can be a membrane air dryer such as Air Products Corp. Prism® air dryer, Model No. PE1015-E1-3A-00 or a desiccant air dryer such as Bendix AD-9™, AD-IS®, and AD-IP™ air dryers. If a membrane air dryer is utilized, then a sweep line (not shown) should be provided to allow continuous drying of the compressed air.

A line 16 is provided between the compressor 12 and air dryer 14. The line 16 facilitates transportation of compressed air from the compressor 12 to the air dryer 14. If an oil-less compressor is not used, however, a coalescing filter (not shown) can be provided along the line 16. A coalescing filter provided along the line 16 can remove contaminants from the compressed air generated by the compressor 12. As those skilled in the art will appreciate, the coalescing filter can be selected from a variety of types and may have various configurations.

The compressor 12 and air dryer 14 serve together as one source, generally indicated by the designation S1, of dry compressed air to the central tire inflation system 11. The charging system 10 also includes a reservoir (or supply tank) 18 that is capable of being discharged and recharged with dry compressed air. The reservoir 18 stores dry compressed air, and can serve as another source, generally indicated by the designation S2, of dry compressed air to the central tire inflation system 11. As shown in FIG. 1, the first source S1 (the compressor 12 and air dryer 14) and the second source S2 (reservoir 18) are arranged parallel to one another. Depending on the requirements of the central tire inflation system 11, the charging system 10 is configured so that dry compressed air can be supplied to the central tire inflation system 11 from the source S1, the source S2, or both sources S1 and S2 simultaneously.

As shown in FIG. 1, a supply line 19 is provided to fluidly connect the source S1 (the compressor 12 and air dryer 14) and source S2 (the reservoir 18) to the central tire inflation system 11. The supply line 19 allows for fluid communication between the compressor 12, the reservoir 18, and the central tire inflation system 11. Furthermore, a check valve 20 is provided along the supply line 19 downstream of the compressor 12, and upstream of the reservoir 18 and central tire inflation system 11. The check valve 19 serves to prevent backwards flow through the line 19 to the compressor 12.

A control valve 21 is provided to control the flow of the dry compressed air supplied by the charging system 10 into the central tire inflation system 11. The control valve 21 is positioned along the supply line 19 upstream of the central tire inflation system 11. As shown in FIG. 1, the control valve 21 is interposed between the central tire inflation system 11, and a first branch line 22 and a second branch line 23 extending from the reservoir 18.

To control flow of the dry compressed air into the central tire inflation system 11, the control valve 21 is actuated between opened and closed positions according to the demands of the operator. The operator of the vehicle will initiate operation of the control valve 21 by selecting the desired air pressure in the tires of the vehicle. A control system (not shown) provided as part of the central tire inflation system 11 will actuate the control valve 21 accordingly. In doing so, the control system can use sensors (not shown) within the central tire inflation system 11 to provide feedback so that the control valve 21 can be opened when the dry compressed air is required and closed when the dry compressed air is not required.

The requirements of the central tire inflation system 11 determine the amount of dry compressed air needed to inflate or deflate the tires of the vehicle, and, the configuration of the charging system 10 afforded by the parallel arrangement of the source S1 and the source S2 allows dry compressed air to be supplied by the source S1, the source S2, or both sources S1 and S2 simultaneously. For example, when the control valve 21 is initially opened, the central tire inflation system 11 can be initially supplied by dry compressed air from the source S2, the reservoir 18. After the dry compressed air from the source S2 has been depleted somewhat, the compressor 12 can be activated so that dry compressed air can be simultaneously supplied by both the sources S1 and S2. Once the dry compressed air from the source S2 has been further depleted, the compressor 12 can continue to operate so that source S1 can provide dry compressed air to the central tire inflation system 11 until the control valve 21 is closed.

Valves 26 and 28 positioned in the first and second branch lines 22 and 23 allow the reservoir 18 to be alternately discharged and recharged according to the demands of the central tire inflation system 11. The first branch line 22 includes the check valve 26 provided between the supply line 19 and the reservoir 18, and the second branch line 23 includes the pressure protection valve 28 provided between the supply line 19 and the reservoir 18.

The check valve 26 is provided to allow flow of dry compressed air stored in the reservoir 18 through the first branch line 22. For example, the check valve 26 is configured to open when the pressure in the supply line 19 is lower than the pressure in the reservoir 18, and close when the pressure in the supply line 19 is higher than the pressure in the reservoir 18. When the check valve 26 is opened, the reservoir 18 discharges, and dry compressed air flows out of the reservoir 18 through the first branch line 22 into the supply line 19. Thereafter, the dry compressed air from the reservoir 18 (i.e. the source S2) flows through the control valve 21, and supply the central tire inflation system 11.

The pressure protection valve 28 is provided to prevent flow of the dry compressed air stored in the reservoir 18 through the second branch line 23 out of the reservoir 18, but allow dry compressed air provided by the source S1 (above a specified threshold pressure) to flow through the branch line 23 into the reservoir 18. That is, the pressure protection valve 28 opens only when the pressure of the dry compressed air in the supply line 19 is above a specified threshold pressure. When the pressure protection valve 28 is opened, dry compressed air from the source S1 recharges the reservoir 18.

In addition to the first and second branch lines 22 and 23, lines 30 and 32 also extend from the reservoir 18. A drain valve 34 is provided at the end of the line 30 (opposite from the reservoir 18). If necessary, the drain valve 34 allows the reservoir 18 to be drained of dry compressed air and/or other accumulants.

A governor 36 is provided at the end of the line 32 (opposite from the reservoir 18). The governor 36 can be a Bendix D-2™ governor, and is used to measure the pressure in the reservoir 18. In doing so, the governor 36 provides an output indicating whether the pressure in the reservoir 18 is above or below a specified set-point.

The governor 36 communicates with a pressure switch 37 through a line 38. Together, the governor 36 and pressure switch 37 are used to actuate the compressor 12. The pressure switch 37 can be a Bendix LP-3™ pressure indicator, and it provides an electrical signal corresponding the to the output of the governor 36.

For example, if the pressure in the reservoir 18 is below the specified set-point, the governor 36 will not allow compressed air to pass through the line 38 to the pressure switch 37, and if the pressure in the reservoir 18 is above the specified set-point, the governor 36 will allow compressed air to pass through the line 38 to the pressure switch 37. The pressure switch 37 is configured so that an electrical signal is provided corresponding to the state of the reservoir when air does not pass through the line 38, and another electrical signal is provided corresponding to the state of the reservoir when air does pass through the line 38. The electrical signals provided by the pressure switch 37 are relayed to an electrical breaker 40.

As an alternative to using both the governor 36 and pressure switch 37, a pressure switch communicating with the interior of the reservoir 18 can be used. Such a pressure switch could sense the pressure in the reservoir 18, and provide electrical signals relayed to the electrical breaker 40 corresponding to whether the pressure in the reservoir 18 is higher or lower than the specified set-point. As discussed below, the electrical signals provided by such a pressure switch serve in operating the compressor 12.

Depending on the electrical signals received from the pressure switch 37, the electrical breaker 40 activates and deactivates the compressor 12. When the electrical signals indicate that the pressure in the reservoir 18 is lower than the set-point, the electrical breaker 40 activates the compressor 12 if the compressor 12 is in the off state, and maintains the compressor 12 in the on-state, if the compressor 12 is already operating. Furthermore, when the electrical signals indicate that the pressure in the reservoir is higher than the set-point, the electrical breaker 40 deactivates operation of the compressor 12 if the compressor 12 is in the on state, and maintains the compressor 12 in the off-state if the compressor is already not operating. As such, operation of the compressor 12 can be controlled according to the pressure in the reservoir 18.

As discussed above, the configuration of the charging system 10 allows dry compressed air to be supplied from the source S1, the source S2, or both sources S1 and S2 simultaneously. For example, so that the charging system 10 can supply dry compressed air to the central tire inflation system 11, the control valve 21 is first actuated to the open position. Assuming the reservoir 18 is initially charged, the supply line 19 (and the central tire inflation system 11) will have a lower pressure than the dry compressed air in the reservoir 18. In response to the lower pressure in the supply line 19, the check valve 26 opens so that the reservoir 18 can discharge dry compressed air. As such, the dry compressed air from the source S2 flows through the first branch 22 into the supply line 19. Thereafter, the dry compressed air from the source S2 flows through the control valve 21, and supplies the central tire inflation system 11

After the dry compressed air from the reservoir 18 has been somewhat depleted, the pressure in the reservoir 18 will decrease below the set-point. As discussed above, the pressure switch 37 will correspondingly provide electrical signals that are relayed to the electrical breaker 40 so that the compressor 12 can be activated. Once the compressor 12 is activated by the electrical breaker 40, dry compressed air will be supplied by the source S1. If the pressure in the supply line 19 (and the central tire inflation system 11) remains lower than the dry compressed air in the reservoir 18, the check valve 26 will remain opened, and dry compressed air will continue to be discharged from the reservoir 18. During such conditions, dry compressed air will be simultaneously supplied to central tire inflation system 11 from both the sources S1 and S2.

When the dry compressed air from the reservoir is further depleted, and the pressure in the reservoir 18 decreases below the pressure in the supply line 19, the check valve 26 closes. When the check valve 26 is closed, flow of dry compressed air through the first branch line 22 is prohibited. However, with the check valve 26 closed, the central tire inflation system 11, will continue to be supplied by the source S1. As discussed above, the compressor 12 will continue to operate because the pressure in the depleted reservoir 12 is below the set-point. As such, the compressor 12 will continue to operate so that the requirements of the central tire inflation system 11 can be satisfied.

Once the requirements of the central tire inflation system 11 are satisfied, the control valve 21 will be closed. As discussed above, sensors will serve to provide feedback to the control system of the central tire inflation system 11 so that the control valve 21 can be closed when dry compressed air is no longer required. When the control valve 21 is in the closed position, however, the compressor 12 will continue to operate until the pressure in the reservoir 18 increases above the set-point, and the reservoir 18 is again charged.

When the control valve 21 is in the opened position, and dry compressed air is being supplied to the central tire inflation system 11, the pressure protection valve 28 will remain closed. In fact, the pressure protection valve 28 will normally remain closed until the control valve 21 is in the closed position, and pressure in the supply line 19 exceeds a specified threshold pressure. For example, when the control valve 21 is in the closed position, and the compressor 12 continues to operate, pressure in the supply line 19 will increase due to the dry compressed air supplied by the source S1. When the pressure in the line 19 is above the specified threshold pressure, the pressure protection valve 28 opens, and dry compressed air from the source S1 flows through the second branch line 23 to recharge the reservoir 18. The compressor 12 continues to operate so that dry compressed air is provided to the reservoir 18 until the pressure in the reservoir 18 increases above the set-point. Thereafter, because of the corresponding electrical signals provided by the pressure switch 37, the electrical breaker 40 will discontinue operation of the compressor 12.

While in accordance with the Patent Statutes, only the best mode and exemplary embodiments have been presented and described in detail, it is to be understood that the invention is not limited thereto or thereby.

The invention claimed is:

1. A charging system for supplying compressed air to a destination, comprising:
    a compressor for generating compressed air; a reservoir capable of storing the compressed air, wherein, under a predetermined pressure condition, said compressor and said reservoir simultaneously supply the compressed air to the destination;
    a supply line fluidly connecting said compressor and said reservoir to the destination, and
    a pressure protection valve positioned between said reservoir and said compressor wherein the compressed air from the compressor is prevented from recharging the reservoir by the pressure protection valve when a pressure between the reservoir and the destination in the supply line is below a specified threshold pressure.

2. A charging system according to claim 1, wherein the destination to which the compressed air is supplied is a central tire inflation system.

3. A charging system according to claim 1, further comprising an air dryer positioned between said compressor and the destination, wherein said air dryer is used to remove moisture from the compressed air.

4. A charging system according to claim 1, wherein said compressor and said reservoir are arranged in parallel fluid paths to one another.

5. A charging system according to claim 4, further comprising a pressure switch responding to the pressure in said reservoir to operate said compressor, and a first check valve positioned between said reservoir and the destination.

6. A charging system according to claim 5, wherein, under a predetermined pressure condition in the reservoir, said pressure switch activates said compressor and a second check valve between the compressor and the destination is opened to supply the compressed air to the destination.

7. A charging system according to claim 6, wherein, under said predetermined pressure condition, said pressure switch activates said compressor to generate the compressed air because the pressure in said reservoir is below a specified set-point, and the compressed air passes through said first check valve from said reservoir because the pressure in said supply line is lower than the pressure in said reservoir.

8. A charging system according to claim 5, wherein:
the compressed air from the compressor does not pass into the reservoir when the pressure protection valve is closed; and
said pressure protection valve is opened when a pressure in the supply line is above the specified threshold pressure so that the compressed air passes through said pressure protection valve into said reservoir.

9. A charging system according to claim 8, wherein, under said predetermined pressure condition, said pressure switch activates said compressor to generate the compressed air because the pressure in said reservoir is below a specified set-point, and the compressed air passes through said pressure protection valve into said reservoir because the pressure in said supply line is higher than the specified threshold pressure.

10. A charging system for supplying compressed air to a destination, comprising:
a compressor for generating compressed air;
a reservoir capable of storing the compressed air, said compressor and said reservoir being arranged parallel with one another, wherein said compressor and said reservoir fluidly communicate with the destination under a first pressure condition;
a supply line fluidly connecting said compressor, said reservoir, and the destination; and
a pressure protection valve positioned between said reservoir and said compressor, wherein said compressor fluidly communicates a portion of the compressed air to said reservoir only under a second pressure condition in the supply line, the second pressure condition causing the pressure protection valve to open.

11. A charging system according to claim 10, wherein the compressed air is simultaneously supplied to the destination under said first pressure condition.

12. A charging system according to claim 10, wherein, under said second pressure condition, operation of the charging system has supplied the destination with the compressed air, and said reservoir, if discharged of the compressed air, is recharged with the compressed air from said compressor.

13. A charging system according to claim 10, further comprising a check valve positioned between said reservoir and the destination along said supply line, and a pressure switch responding to the pressure in said reservoir in relation to a specified set-point to operate said compressor.

14. A charging system according to claim 13, wherein, under said first pressure condition, said pressure switch activates said compressor to generate the compressed air because the pressure in said reservoir is below said specified set-point.

15. A charging system according to claim 13, wherein, under said first pressure condition, the compressed air passes through said check valve from said reservoir because pressure in said supply line is lower than the pressure in said reservoir.

16. A charging system according to claim 10, further comprising a pressure switch responding to the pressure in said reservoir in relation to a specified set-point to operate said compressor.

17. A charging system according to claim 16, wherein, under said second pressure condition, said pressure switch activates said compressor to generate the compressed air because the pressure in said reservoir is below said specified set-point.

18. A charging system according to claim 16, wherein, under said second pressure condition, the compressed air passes through said pressure protection valve into said reservoir because the pressure in said supply line is higher than a specified threshold pressure.

19. An apparatus for supplying compressed air to equipment requiring compressed air, the apparatus comprising:
a compressor for generating the compressed air;
a supply line fluidly communicating with the compressor, a reservoir and the equipment;
the reservoir for storing the compressed air, the reservoir being capable of alternately supplying compressed air to the equipment through a first branch line and receiving compressed air from the compressor through a second branch line;
the first branch line including a check valve positioned between said reservoir and the equipment, wherein said check valve opens to provide the compressed air from the reservoir to the equipment; and
the second branch line including a pressure protection valve positioned between said reservoir and said compressor, wherein said pressure protection valve opens under a first pressure condition within the supply line so that said reservoir can be recharged with compressed air, and wherein said pressure protection valve closes under a second pressure condition within the supply line so that said reservoir is not recharged with compressed air while the compressed air is provided to the equipment.

20. An apparatus according to claim 19, further comprising an air dryer positioned downstream of said compressor, wherein said air dryer removes moisture from the compressed air generated by said compressor.

21. An apparatus according to claim 19, wherein said check valve opens when the pressure in the supply line is lower than the pressure in said reservoir, and wherein said pressure protection valve opens when the pressure in said supply line is above a threshold pressure.

22. An apparatus according to claim 21, further comprising a supply line connecting said compressor, said reservoir, and said equipment, and a control valve positioned along said supply line upstream of the equipment, said control valve being opened and closed to control the flow of the compressed air through said supply line to the equipment.

23. An apparatus according to claim 22, further comprising a pressure switch, wherein said pressure switch responds to the pressure in said reservoir in relation to a specified set-point to operate said compressor.

24. An apparatus according to claim 23, wherein, when said control valve is opened, the compressed air will be supplied by said compressor if the pressure in said reservoir is below the specified set-point and by said reservoir if the pressure in said supply line is below the pressure in said reservoir.

25. An apparatus according to claim 22, wherein, when said control valve is opened, and the pressure in said supply line is below said threshold pressure, the compressed air generated by said compressor will flow through said control valve.

26. An apparatus according to claim 22, wherein, when said control valve is closed, and the pressure in said supply line is above said threshold pressure, the compressed air generated by said compressor will flow through said pressure protection valve into said reservoir.

27. An apparatus for supplying compressed air to equipment requiring compressed air, the apparatus comprising:
a means for generating compressed air;
a means for storing compressed air;
a supply line connecting said means for generating, said means for storing, and the equipment;

a means for simultaneously communicating compressed air from said means for generating and said means for storing with the equipment as a function of the pressure in said means for storing in relation to a specified set-point and as a function of the pressure in said means for storing in relation to the pressure in said supply line; and a means for controlling the recharging of the means for storing, the means for controlling comprising a pressure protection valve positioned between said means for storing and said means for generating, the compressed air generated by said means for generating flowing through said pressure protection valve to recharge said means for storing when the pressure in said supply line is above a threshold pressure.

28. An apparatus according to claim 27, further comprising a means for controlling flow of the compressed air from the apparatus to the equipment, said means for controlling flow being positioned along said supply line downstream of said means for generating compressed air and said means for storing.

29. An apparatus according to claim 27, wherein said means for simultaneously communicating compressed air comprises a check valve positioned between said means for storing and the equipment, and a pressure switch responding to the pressure in said means for storing in relation to a specified set-point to operate said means for generating.

30. An apparatus according to claim 29, wherein, under a predetermined pressure condition, said pressure switch activates said means for generating to generate the compressed air because the pressure in said means for storing is below the specified set-point, and the compressed air passes through said check valve from said means for storing because the pressure in said supply line is lower than the pressure in said means for storing.

31. A method for providing compressed air to equipment requiring compressed air, the method comprising:
    connecting a compressor and a reservoir to the equipment via a supply line;
    opening and closing a control valve positioned along the supply line according to the requirements of the equipment; and
    simultaneously supplying compressed air from the compressor and the reservoir to the equipment under a predetermined pressure condition, the compressed air from the compressor is prevented from recharging the reservoir by a pressure protection valve between the reservoir and the compressor when a pressure between the reservoir and the equipment is below a threshold pressure.

32. A method according to claim 31, further comprising recharging the reservoir with the compressed air from the compressor when the demands of the equipment have been satisfied.

33. A method according to claim 31, wherein the compressor and the reservoir are arranged parallel to one another.

34. A method according to claim 31, wherein, under the predetermined pressure condition, a pressure switch responding to the pressure in the reservoir activates the compressor and a check valve positioned between the reservoir and the supply line is opened to supply the compressed air to the equipment.

35. A method according to claim 34, wherein, under the predetermined pressure condition, the pressure switch activates the compressor because the pressure inside the reservoir is below a specified set-point, and the compressed air passes through the check valve from the reservoir because the pressure in the supply line is lower than the pressure in the reservoir.

36. A method according to claim 31, further comprising recharging the reservoir with the compressed air generated by the compressor when the pressure in the supply line is higher than the threshold pressure.

37. A method according to claim 36, wherein, when the pressure in the supply line is higher than the threshold pressure, the pressure protection valve positioned between the reservoir and the compressor opens so that the compressed air generated by the compressor passes into the reservoir.

38. An apparatus for supplying compressed air to equipment comprising:
    a compressor for generating the compressed air;
    a reservoir capable of storing the compressed air;
    a supply line fluidly communicating said compressor and said reservoir with the equipment;
    a control valve positioned along said supply line between the equipment, and said compressor and said reservoir;
    a check valve positioned between said reservoir and said supply line, wherein, when under a first pressure condition in the reservoir, the compressed air is discharged from said reservoir through said check valve; and
    a pressure protection valve positioned between said reservoir and said supply line, wherein, when under a second pressure condition in the supply line, the reservoir is recharged with the compressed air from said compressor through said pressure protection valve, and wherein the pressure protection valve prevents the reservoir from being recharged under a third pressure condition in the supply line.

39. An apparatus according to claim 38, further comprising a pressure switch responding to the pressure in said reservoir in relation to a specified set-point, wherein said pressure switch activates operation of said compressor when the pressure in said reservoir is below said specified set-point and deactivates operation of said compressor when the pressure in said reservoir is above said specified set-point.

* * * * *